United States Patent [19]

Budney

[11] Patent Number: 5,687,139
[45] Date of Patent: Nov. 11, 1997

[54] ELECTRICAL LOAD OPTIMIZATION DEVICE

[76] Inventor: Stanley M. Budney, 8069 Rowan Rd., Cranberry Township, Butler County, Pa. 16066

[21] Appl. No.: 440,347

[22] Filed: May 12, 1995

Related U.S. Application Data

[63] Continuation-in-part of Ser. No. 763,490, Sep. 23, 1991, Pat. No. 5,426,620, which is a continuation-in-part of Ser. No. 316,541, Feb. 28, 1989, abandoned, which is a continuation of Ser. No. 29,245, Mar. 23, 1987, abandoned.

[51] Int. Cl.$^6$ .............. G04B 47/00; H01H 7/00; H01H 43/00
[52] U.S. Cl. .............. 368/10; 368/108; 307/35; 307/39; 307/141.4
[58] Field of Search .............. 368/10, 107–113; 307/35, 39, 40, 52, 141, 141.4; 315/159; 361/22

[56] References Cited

U.S. PATENT DOCUMENTS

| | | | |
|---|---|---|---|
| 2,940,660 | 2/1960 | Edwards | 315/360 |
| 3,939,361 | 2/1976 | Aidala et al. | 307/141 |
| 4,020,358 | 4/1977 | Wyland | 307/39 |
| 4,141,407 | 2/1979 | Briscoe et al. | 307/39 |
| 4,151,426 | 4/1979 | Price | 307/141 |
| 4,209,728 | 6/1980 | Membreno | 307/141 |
| 4,213,058 | 7/1980 | Townsend | 307/141.4 |
| 4,415,943 | 11/1983 | Wortman | 361/22 |
| 4,465,965 | 8/1984 | Chernotsky et al. | 307/35 |
| 5,160,831 | 11/1992 | Thaler et al. | 219/506 |

*Primary Examiner*—Vit W. Miska

[57] ABSTRACT

A demand control apparatus includes a switch in the control signal line of an electrically powered piece of equipment. The switch is controlled by a digital recycle counter so as to periodically cycle off and on during times when an equipment generated control signal is present in the control signal line. The control signal line could be a thermostat control line on a standard air conditioning unit and the equipment generated control signal would normally correspond to the thermostat calling for cooling. When the switch is opened the equipment reacts as though the thermostat has been satisfied. When the equipment generated AC control signal is sensed in the control signal line, a digital counter is activated to hold the switch open until a preset number of AC pulses have occurred. The switch is then closed until a second preset number of AC pulses have occurred. The open-closed cycle is repeated as long as the equipment control signal is present. The cycle periods can be adjusted in response to external conditions such as ambient temperature or line frequency. In multiple applications, load diversity is improved and aggregate demand is reduced after power outages. Sequential start of diverse and multiple loads is assured.

11 Claims, 1 Drawing Sheet

ELECTRICAL LOAD OPTIMIZATION DEVICE

CROSS REFERENCE TO RELATED APPLICATIONS

This application is a continuation-in-part of Ser. No. 07/763,490, filed Sep. 23, 1991, now U.S. Pat. No. 5,426,620, which is a continuation-in-part of Serial No. 07/316,541, filed Feb. 28, 1989, now abandoned, which is a continuation of Ser. No. 07/029,245, filed Mar. 23, 1987, now abandoned.

BACKGROUND OF THE INVENTION

1. Field of the Invention

The present invention relates to a load control and management apparatus for controlling the load demand and operation of electrical energy-consuming equipment. More particularly, the present invention relates to a control and management apparatus for electrical power networks that allows individual control of electrical loads of energy-consuming equipment on the network. The unique apparatus of this invention optimizes the performance of the individual equipment while precisely initiating, controlling, and synchronizing its individual load activities with the energy supplied thereto, so that the life and efficiency of the equipment is enhanced while overall load demand is controlled.

The apparatus has been shown to provide significant overall energy savings when used on equipment with normal reserve capacity, such as air conditioning and refrigeration units and heat pumps. These energy savings can be achieved without the sacrifice of any reliability, durability, or performance standards of the equipment. As an example, the same house can be kept just as cool, relative to outside temperature, using the same air conditioner with less energy consumption when the unique apparatus of the instant invention is employed.

In addition, the improved apparatus disclosed herein is capable of being controlled and synchronized by the power company, over its own lines, without the use of superimposed or atmospherically transmitted radio frequency signals. The power company is therefore freed from the whims of its customers in a way never before possible and, at the same time, is freed from the radio frequency noise regulations of the Federal Communications Commission.

The fields most likely to benefit from the advantages of this invention are the basic industry of electrical power generation and all the many and diverse fields that use electrical equipment. The major benefactors among the fields of users will be the refrigeration, heating and air conditioning industries and all users of such equipment. Of course, any reduction in the overall electrical power needed by an area tends to benefit the ecology of that area by virtue of reducing local air and water pollution.

Thus it can be seen that the potential fields to benefit from this invention are myriad and the particular preferred embodiments described herein are in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Electric utility companies supply power to many individual customers. The sum total of the demand of the individual customers is the aggregate demand seen at the generation plant of the utility. At certain daily and seasonal times, customer demand is higher than at other, "off-peak" periods. The basic utility problem is that the company must have sufficient capacity at the "peak" periods to satisfy maximum customer demand or load requirements. This maximum capacity is far in excess of that required for normal off-peak periods. The electric company is therefore required to build and maintain entire power generation plants that serve no function other than to meet peak period demands. It is estimated that the cost of building a new generating facility is $6,000 to $10,000 per kilowatt of production capacity, whereas the cost of saving those same kilowatts of capacity by using my demand control apparatus is on the order of $200 per kilowatt of capacity, supplied from demand side management.

Electric companies customarily use a demand charge as well as the regular schedule of rates for energy, this demand charge being generally based upon the highest average kilowatt demand occurring during a predetermined interval of, say, 10-15 or 30 minutes, during some longer period of time, say, one month. It is therefore evident that a consumer whose demand charge increases because of a high average kilowatt demand, during a tiny interval of say 15 minutes in one month, will obviously be desirous of controlling his power demand and limiting it to the lowest value practicable. In simple terms, one pays most for electrical energy if they use it at the fastest rate. The total of kilowatt-hour usage and the highest demand reading over a billing period determine the total charges to the customer. Surprisingly, the demand charge on an electric utility bill is sometimes the higher of the two costs involved. Even more surprising is the fact that many consumers are not even aware their electric bill is computed in this manner! By instituting demand charges the utility companies have attempted to shave the peaks from energy load requirement cycles by imposing a financial penalty on users who consume heavily during short, peak periods. Large users are thus encouraged to level out their energy consumption so as to be constant during all time periods. The approach is somewhat of a shell game because the individual user's peak periods do not always coincide with the peaks seen by the power company at the central power station. Note that if all the large users shifted their peak demands to a different time of day, then that time of day automatically becomes the peak demand time as seen at the central generating station. The demand charge system does nothing to prevent this sort of thing from happening. The main problem with this approach is that when people need power they need power, and the fact that they could get it cheaper by getting it later is irrelevant. One could even say, the main problem with this approach is that it simply does not work. In any case, the financial incentive route has not been entirely successful as a method of reducing peak electrical energy demands.

There have been many attempts to reduce electrical energy-consuming equipment demand, particularly during "peak" periods, as metered by the utility company. These previous methods usually involve programmed timers or microprocessors which shut off equipment during a portion of each metered interval so that demand is reduced and the utility meter reads less demand during that interval. In other words, if a metered demand interval is of a fifteen minute duration and if, during successive fifteen minute intervals, a machine is shut off for some portion of each interval, the reading of the utility meter will reflect a lower demand during each interval, and the demand charges will be lower.

Devices for reducing electrical demand during certain times are old and well known in the art. Many, if not all, of these systems use the brute force technique of simply cutting the main source of power to an individual piece of energy consuming equipment with some sort of time activated switch. It has been found that brute force cyclic power interruption significantly shortens the life of many types of expensive electrically powered mechanical equipment. A prime example is the main compressor unit on a refrigeration unit. Such a compressor must be run through predetermined and important shutdown (pump down) and startup cycles to prevent serious damage. Simple power cutoff devices simply have no way of allowing these shutdown and startup cycles to occur as designed into the equipment.

Recently, the need for some sort of control, other than financial incentive, of the demands on power utility networks has become acute. As a result, numerous power cutoff or cycling systems have been developed for installation at individual user sites. These generally are crudely controlled switching devices installed in the primary supply power line ahead of the equipment to be controlled. These crude main power cutoff devices have the same effect as pulling the plug on the equipment being controlled and are referred to as "plug pullers" throughout the remainder of this discussion. For example, a timed switch may be installed on an electrical hot water heater which switches off power to the heater elements during periods of the day when people are not likely to have a need for hot water. The control of these switches is done with simple day timers in the crudest of these devices, and may be accomplished from the utility, using radio frequency signals, on more sophisticated devices. The actual switches normally operate to simply remove the power from the equipment for, say, a couple of hours during the evening, or they may initiate a pulsing action which cycles the power on and off during the controlled time period and allow normal operation at all other times. The following known prior art has been directed to providing such crude cutoff controls for electrical equipment. As will be seen, the sophistication, simplicity, and effectiveness of my invention is not rivaled in the prior art.

U.S. Pat. No. 4,141,407, issued to Briscoe et al. on Feb. 27, 1979, shows a power demand limiting circuit for an air temperature control apparatus coupled with a source of municipal power through a demand meter. A timer is programmed to cycle a timer switch off at least once during any period determined to be a demand period by a utility wattmeter. The timer switch is arranged on the main power input to all loads and thus is a brute force "plug puller" as defined above. The timer switch is incapable of any sort of external control, short of manual activation of an override switch which disables the entire unit. Briscoe et al. disclose a power demand limiting circuit which utilizes a programmable timer in conjunction with selector switches which manually select air conditioning or heating during some portion of a metered demand interval. The continuous connection of the timer to the power source forms an additional parasitic power drain of its own.

By contrast, the control apparatus of the instant invention is wholly installed in the control signal line of the thermostat of each individual load and thus is not a brute force "plug puller". The most glaring difference is connecting a separate demand control process apparatus wholly within a control power line at the point of control of each load; Briscoe clearly teaches a demand control process apparatus within the supply power line. It should be emphasized that switching of the thermostatic control line, within or directly adjacent to the equipment, is not the equivalent of switching off the main supply power line. The control switch of the instant invention is controlled and cycled by a digital pulse counter instead of a crude "timer", thus leading to load initiation and synchronization benefits not possible with a crude timer device as shown by Briscoe et al.

By further contrast, the instant invention is capable of external control through ambient condition sensing devices or through frequency change sensing internal devices capable of being activated by the electric utility company. Such external control is not even suggested by the Briscoe et al. device. Also, the instant invention does not create a continuous parasitic power loss as would the timer of Briscoe et al.

U.S. Pat. No. 4,027,171, issued to Browder et al. on May 31, 1977, shows a power demand limiting system for limiting the peak power demand of space conditioning loads coupled with an electrical utility power supply by space temperature responsive switching means. The system includes timer means for cyclically coupling and uncoupling the space conditioning load with the electric utility power supply through the space temperature responsive switching means, and timer control means for selectively energizing and de-energizing the timer means. Browder et al. state that the cyclic control switch may be crudely controlled (disabled or enabled only) by the electric utility. The cyclic periods of Browder et al. cannot be adjustably controlled, either manually, remotely, or by any other means.

By contrast, the device of the instant invention does not use a timer for cycling the switch but rather uses a digital recycle counter which allows for precise orchestration of the startup of the many individual loads that may be on the overall network. Also, in contradistinction with Browder et al., the instant invention allows the external control of the cyclic periods of the cyclic switch. The cyclic periods of the instant invention may be adjusted either with a local ambient condition sensor or with a line frequency change sensing device controllable by the utility company. In addition, Browder et al., although envisioning simple activation of the timer switch by remote control from the electric utility, does not in any way teach the power line frequency change responsive control of the instant invention. A major difference is the instant invention is always on line cycling the load in the optimum run modes, and allows interaction of the electric utility to alter the length of optimum run periods.

By way of historical interest, U.S. Pat. No. 1,503,130, issued to Moore on Jul. 29, 1924, shows an electrical apparatus for automatically controlling peak demands. It is interesting to note that, even at this early date, power companies were experiencing problems with peak demand periods overloading their electrical generating equipment. The apparatus of Moore regulates the load absorbed by an electrode furnace by retracting the electrodes with an electrode motor. The null point of the regulatory apparatus is changed so as to reduce the load by retracting the electrodes at such time as the energy used exceeds a given amount in a 15 minute time period. The system is designed for use on equipment with finely tunable load consumption characteristics, such as an immersible electrode metallurgical melting furnace. As such, the regulatory apparatus is not suited to the purposes of the instant invention. The patent does not hint at or disclose any apparatus for on-off cycling of the load, let alone any externally controlled variation of those cyclic periods.

By contrast, the device of the instant invention does not use a timer for cycling the switch but rather uses a digital recycle counter in the control signal line of the load, which allows for precise orchestration of the startup of the many individual loads that may be on the overall network. Also, in contradistinction with Moore, the instant invention allows the external control of the cyclic periods of the cyclic switch. The cyclic periods of the instant invention may be adjusted either with a local ambient condition sensor or with a line frequency sensing device controllable by the utility company. In addition, Moore does not in any way teach the utility-activated power line frequency change responsive control of the instant invention. Also, the continuous connection of the timer to the power source forms an additional parasitic power drain of its own.

U.S. Pat. No. 1,873,238, issued to Wood on Aug. 23, 1932, shows an off-peak power and metering system and apparatus. The patented device disconnects an electrical water heater load from the source during predetermined peak periods of the day. As such it is another "plug puller" as described previously. The patent slows the power metering device during off-peak times of day so as to effectively give the consumer more power for the same money during those times. There is no mention or contemplation of demand charge reduction in Wood. The patent does not hint at or disclose any apparatus for short period on-off cycling of the load during either the peak or off-peak periods, let alone any externally controlled variation of those cyclic periods.

By contrast, the device of the instant invention does not use a timer for cycling any sort of switch, but rather uses a digital recycle counter which allows for precise orchestration of the startup of the many individual loads that may be on the overall network. Also, in direct contradistinction with Wood, the instant invention allows the external control of the cyclic periods of the cyclic switch. The cyclic periods of the instant invention may be adjusted either with a local ambient condition sensor or with a line frequency sensing device controllable by the utility company. In addition, Wood does not in any way teach the utility-activated power line frequency responsive control of the instant invention. In addition, the continuous connection of the timer to the power source forms an additional parasitic power drain of its own. As a last distinction from Wood, the instant invention does not in any way alter the power measuring characteristics of the power meter, but rather slows up the average use of power by the load. Present day regulations prohibit any alteration of the power meter.

U.S. Pat. No. 3,296,452, issued to Williams on Jan. 3, 1967, shows a load regulation device for the maintenance of electric loads within the limits on which demand rates are based. The patent proposes an alarm to be sounded as the energy consumed by a process approaches the maximum allowed during any given demand interval of, say, 15 minute duration. Equipment operators would shut down the equipment for the remainder of the demand period upon hearing the alarm. Williams suggests that automatic shutdown of the equipment could be accomplished in lieu of the alarm, but no means for accomplishing this function are disclosed. The scheme allows for energy to be consumed at a greater rate during the beginning of the demand interval with the stop alarm becoming more sensitive to the straight line demand curve near the end of the demand interval. The system of Williams, although relatively sophisticated, is in the final analysis simply a "plug puller" as discussed above. Of primary interest is Williams' use of digital pulse counters similar to the pulse counters used by the instant invention. However, Williams uses the digital pulse counters in an entirely different way and for a different purpose than the instant invention, and his pulse counters are in no way responsive to automatic external variation.

By contrast, the control switch of the instant invention is installed in series with the control signal line of a thermostat or other environmentally sensitive sensor, and thus is not a brute force "plug puller". It should be emphasized that switching of a thermostatic control line, within or directly adjacent to the equipment, is not the equivalent of switching off the main power line. Also, in contradistinction with Williams, the instant invention allows the external control of the cyclic periods of a cyclic switch. The cyclic periods of the instant invention may be adjusted either with a local condition sensor or with a line frequency sensing device controllable by the utility company. In addition, Williams does not in any way teach the utility-activated power line frequency responsive control of the instant invention.

U.S. Pat. No. 3,496,337, issued to Voglesonger on Feb. 17, 1970, shows a sequencing circuit for power consuming devices. The patent shows a series of heating elements with individual thermostatic controls. The total current to the ensemble is monitored by an ammeter with a high and low limit switch built in. As long as the total current is below the preset maximum, mechanical timers sequentially introduce further heating elements to the line. If the maximum current is exceeded, the introduction of further heating elements is inhibited. This control device is another "plug puller" as previously discussed. There is no switching introduced into the thermostatic control lines, let alone an externally controlled, synchronized, variable period, cycling of those lines as disclosed by the instant invention.

U.S. Pat. No. 3,677,335, issued to Weatherston on Jul. 18, 1972, shows a staged heating and cooling system. The patent proposes a control system for a heating and cooling system in which the amount of heating and the amount of cooling are both controlled in timed incremental stages by means of a signal from an up-down electronic counter which operates to call for the next successive stage at timed intervals in accordance with an electronic clock. The patented scheme, basically, is to successively turn on more individual heating or air conditioning units at, say, two minute intervals until a desired temperature level of an enclosure has been reached. The device is not similar in function or structure with the instant invention. It essentially discloses a fancy single thermostat which is plugging in or disconnecting a group of related equipment. Of interest, only, is the teaching that binary up-down pulse counters were known prior to my invention in the field of heating and air conditioning.

U.S. Pat. No. 4,208,593, issued to Sullivan on Jun. 17, 1980, shows a method and system of selective disconnection of loads for a power source. The primary thrust of the patent is the provision of a redundant demand control device which will function to disconnect individual loads and sound an alarm in the absence of power to the primary demand controller itself. The patent teaches the prioritizing of individual equipment at a particular meter location and a brute force removal of the power supply from a low priority piece of equipment in case of a demand overage. By contrast, the instant invention sequences the initialization of load operation. Sullivan teaches no cycling of an individual equipment control, such as a thermostat signal, let alone the provision of an externally controlled variable cycle period.

U.S. Pat. No. 4,245,319, issued to Hedges on Jan. 13, 1981, shows an energy management method and apparatus utilizing duty cycle reduction synchronized with the zero points of the applied voltage. Hedges shows another "plug puller" apparatus which only reacts when a sensed demand limit is being approached. The device sheds certain sensed loads to keep the demand just below this demand limit. Hedges teaches no cycling of an individual equipment control, such as a thermostat signal, let alone the provision of an externally controlled variable cycle period.

These known methods and systems, however, do nothing to prevent damage to the equipment and its components from continuous random on/off operation (plug pulling), which shortens the life of the equipment and increases maintenance and repair expense. None of the prior systems or devices take into account the diverse electrical load requirements for the individual components within one piece of equipment. None of the known methods control and initiate startup of the equipment in universal synchronization with the electrical energy being supplied. A change in the metered interval, such as after a power outage, causes the timing of these methods to be "out of sync" with the metered demand intervals. The previous methods and systems must use additional devices, such as the time delay relays of Briscoe et al., to preclude the equipment from creating a demand surge or overload by simultaneous energization after an outage. None of the prior methods or systems precisely control the operation of the equipment so that it functions in an optimum window for the most efficient performance possible by that particular equipment. None of the previous methods, systems or devices assist in reducing demand by using no energy at all during a significant portion of the operating cycle. They must always be energized in order to function, thereby creating their own continuous load demand.

It can thus be seen that previous systems, methods and devices for load demand reduction are inadequate, and most simply "pull the plug" of a machine to reduce its load demand. This may or may not reduce demand. However, none of the previous methods and systems control and manage load demand, and none control and manage the operation of the equipment or individual subsystems of a complex piece of equipment.

None of the above inventions and patents, taken either singly or in combination, is seen to describe the instant invention as claimed.

SUMMARY OF THE INVENTION

Briefly, the invention comprises a specially controlled switch in the control signal line of individual units of electrical equipment. An example of a control signal line is the thermostat control line on a standard air conditioning unit. The special switch is opened at certain intervals so as to effectively signal the equipment that the sensor providing the control signal has been satisfied. When an AC control signal is sent down the signal line by the equipment control (thermostat), a digital counter is activated which holds the special switch open (off) until a predetermined number of AC pulses have occurred. The special switch is then closed (on) until a second predetermined number of AC pulses have occurred and then the open-closed cycle is repeated or recycled. The type of counter used to control this type of cyclic switching activity is known in the art as a digital recycle counter. The digital recycle counter itself is a conventional and commercially available item. The subject of this patent is not the recycle counter itself, but rather the combination of such a recycle counter with the conventional control line of an electrical load. This cycling of the special switch from open to closed and back again continues as long as there is a control signal present in the signal line (e.g., as long as the thermostat is calling for cooling). When there is no control signal in the signal line (e.g., the thermostat switch is open and no cooling is called for), the digital counter is rendered inactive and its activity will begin anew when a signal is again present.

No energy is consumed by the device unless the electrical control signal line of the equipment is activated. Each time the control signal line is activated the counter first causes an off cycle to be maintained for a certain number of counts, and then an on cycle to be maintained for a certain number of counts. The off cycle and the on cycle are repeated for as long as the control signal line is activated. If the control signal line is deactivated (as by the thermostat switch opening) all counting ceases and the off-on cycles are begun again when the signal line is again activated.

The actual counts being totalized by the digital counter are derived from the voltage peaks in the AC signal line. The number of counts in the off cycle and in the on cycle can each be manually and individually adjusted at a given application site by the setting of DIP switches on an external face of the physical counter unit. A digital optical system responsive to a hand held digital optical transmitter may alternately be used to set and change the pulse count of the cyclic periods.

The off counts and the on counts are set to the optimum values for equipment efficiency under normal operating conditions by manually setting the DIP switches or sending an optical digital code from a hand held transmitter upon installation of the equipment at the given facility. In addition, the digital counter is capable of varying the pulse counts for each cycle based upon the signal from an external source. This variation of the normal pulse counts in each cycle is normally done only in extreme or abnormal circumstances. For example, when an external thermometer indicates that it is very hot or cold outside, the counter is capable of increasing the number of counts in the "on" cycle so as to provide more total cooling or heating capacity, respectively. As another example, when network demand is very heavy, it is possible for the utility to increase the counts in the "off" cycle. The changing of the pulse count cycle by the utility is effected by a line frequency sensor built into or external to the digital counter. Since the line frequency of the power provided over the power lines is under the precise control of the utility company, a means has been provided for the synchronized shedding of peak loads without interrupting the power flow to any customers.

In the example of the control signal line being the line from the thermostat in an air conditioning system, the absence of a control signal voltage in this line normally indicates to the equipment that the air temperature is cool enough for the main refrigeration compressor to be shut down. When the control signal voltage is again present in the thermostat line a normal startup sequence is initiated by the air conditioning equipment. When the special switch is opened the equipment reacts exactly as though the thermostat has been satisfied and the normal refrigeration shutdown sequence is initiated. The special switch of this invention is installed in series with the thermostat switch in the thermostat line at a point as near the equipment load as is possible. It is contemplated that the special switch of this invention could actually be built into an original air conditioning unit. The small size of the invention makes it equally attractive to retrofit existing units.

Accordingly, it is a principal object of the invention to provide a new and improved electrical load optimization device which overcomes the disadvantages of the prior art in a simple but effective manner.

It is a major object of the present invention to provide a superior means for controlling individual load requirements and operation of energy-consuming equipment by imposing a precise optimum run operation on the equipment in universal synchronization with the energy being supplied thereto.

Another object of the invention is to provide a device for initiating, synchronizing and optimizing the operation of individual equipment which is simple and inexpensive to manufacture.

Another object of the invention is to provide a device for initiating, synchronizing and optimizing the operation of individual equipment which is simple and inexpensive to install.

Another object of the invention is to provide a device for initiating, synchronizing and optimizing the operation of individual equipment which is normally fully automatic, therefore requiring no user intervention.

Another object of the invention is to provide a device for initiating, synchronizing and optimizing the operation of individual equipment which requires no alteration of the existing equipment or components of the equipment.

Another object of the invention is to provide a device for initiating, synchronizing and optimizing the operation of individual equipment which uses no energy except when actually controlling the load.

A further object of the invention is to provide a means for controlled management of overall operation of groups of equipment at the same general location which effectively reduces demand by imposing synchronized optimum operation on individual equipment loads in the group.

A further object of the invention is to provide a means for controlled management of overall energy requirements of groups of equipment at the same general location, thereby reducing demand charges from a utility company supplying energy to the equipment.

Another object of the invention is to provide an apparatus for managing the overall energy requirements of electrical equipment which is adjustable in accordance with environmental conditions sensed by interacting condition sensing units.

Another object of the invention is to provide an apparatus for managing the overall energy requirements of a network of electrical equipment at diverse locations which is adjustable in accordance with a change in power line frequency signals initiated by the utility company.

A further object of the invention is to provide a means for synchronized staggered startup of individual loads on a network of electrical equipment at diverse locations in the event of a widespread power outage within the network.

Another object of the invention is to impose load demand and operation control on energy-consuming equipment so that all components of the equipment function individually but in concert during optimum periods of operation, without excessive run-on or premature cut-off, thereby extending equipment life and enhancing functional efficiency.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying Figure, and wherein.

DETAILED DESCRIPTION OF THE PREFERRED EMBODIMENTS

Figure 1:
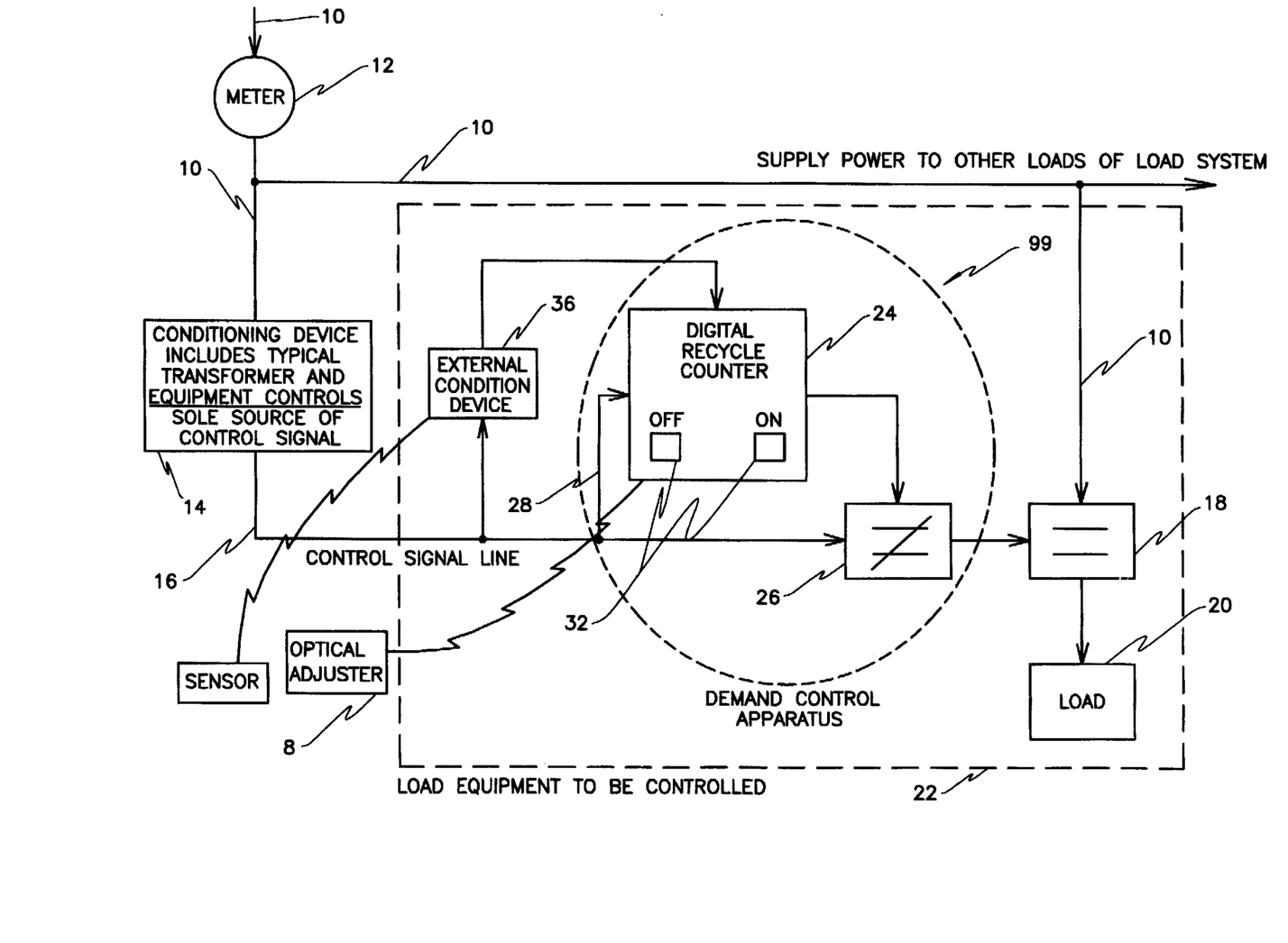
The figure is a schematic diagram of the ensemble of an apparatus and its connections for carrying out the objectives of the invention.

The load demand control system of the present invention is generally comprised of the units enclosed within the dashed oval 99 labeled DEMAND CONTROL APPARATUS in the single drawing figure. With reference to the figure, power lines 10 pass through utility meter 12 at the structure where equipment 22 is located. Meter 12 measures usage and demand of electrical energy at that location. Operative main power line 10 is generally left unconditioned, and supplies operative power to equipment 22. Line 10 also powers a conditioning device 14, such as a transformer, thermostat, pressure limit switch, or the like, which in turn allows electrons to flow or sends a control signal to a control signal line 16. In a typical situation, control signal line 16 would transmit an AC voltage of 24 volts during the periods when a thermostatic control is, say, calling for cooling from an air conditioning unit. The control signal would normally activate switch 18 in main power line 10. Other internal equipment controls (not shown) may also effect the activation of other switches, such as 18, and the demand control device may also be interposed in those lines. For example, there may be a separate control signal line for operation of the ventilation fan of an air conditioner unit. However, for simplification purposes, a single demand control apparatus in a single control signal line of an individual piece of equipment will be described in detail in the following specification.

The demand control apparatus of the invention is interposed in control line 16. It is important to note that the entire demand control apparatus of this invention is connected to existing equipment only by interposition in a normal control signal (e.g. thermostat) line. No other connections are made. In the absence of the demand control apparatus, control power line 16 would open or close switch 18, thereby opening or closing the circuit of operative power line 10 and controlling the flow of operative power to load 20 within equipment 22. Again, it is noted that equipment 22 may include several individual loads 20, such as the compressor unit, control solenoids, several fans, etc. Only one load 20 is shown in equipment 22 for simplification, but the present invention can be used also with complex equipment having diverse multiple loads. The usual conventional electrical grounding means is not shown in the schematic diagrams as it is not a matter of concern in this invention.

The present invention includes digital recycle counter 24 and switch 26 shown in the dashed oval 99 labeled DEMAND CONTROL APPARATUS, as well as external conditioning device 36. It should be pointed out that external condition device 36 may be incorporated into the same physical unit as digital recycle counter 24 if desired. The external conditioning device is merely used to accept external signals in various forms, as they may be generated by various external sensors, and to convert those external signals to a form acceptable by digital recycle counter 24. Device 24 has been called a digital recycle counter because it: (1) counts the oscillations of a sinusoidally alternating input voltage in a digital manner; (2) causes switch 26 to open for a predetermined number of counts and then close for a predetermined number of counts; and (3) repeats or "recycles" the opening and closing pattern indefinitely as long as an input signal is present. All counting stops and the counter is dormant, consuming no energy, when there is no input signal delivered to line 16 by conditioning device 14 (e.g. thermostat 14). When an input control signal appears in line 16, after such a dormant period, the counting and off-on cycling of demand control switch 26 begins anew. For brevity, the phrase "digital recycle counter" has been shortened to "counter" at places in the ensuing description. It should be understood that the "counter" referred to herein refers to the special digital recycle counter as so far described and further amplified in the remaining description. Counter 24 is capable of reacting to other "external" signals in specific ways, as by altering the predetermined counts, more fully described later.

The demand control apparatus is interposed in control signal line 16 and is not directly connected to operative power line 10 and load 20. It is important to note the demand control apparatus of this invention is wholly within a control signal line at the point of control of the load. Input line 28 of counter 24 is tapped into the control signal line 16 at some point between equipment control signal conditioning device 14 and the equipment load control switch 18. Preferably, this connection is made as close to the load control switch as possible. Usually it is possible to make the connection within the physical confines of the equipment itself. In the specific example herein described, the connection could be made within the casing containing the compressor unit of a residential air conditioning unit.

It is important to emphasize that the demand control units of this invention are wholly connected in the control lines of individual subloads of the equipment. In other words, the air conditioner described may have a separate control line for the subloads of the compressor unit and the ventilation fan unit. A separate demand control apparatus could be used to control either one or both of these subloads. The overall power line to all the subloads of the air conditioning unit is generally not in any way altered by the demand control apparatus of this invention. In a typical installation the compressor unit may be cycled through the predetermined off-on periods while the ventilation fan motor is left running continuously throughout the entire time the thermostat is calling for cooling. It should be kept in mind that load 20 of the Figure may represent the total operative power consumed by a piece of equipment, such as an electric hot water heater, but, more generally, it represents an individual subload of a larger complex piece of equipment such as an air conditioner, heat pump, or refrigeration system.

In operation, counter 24 initially receives a flow of electrons over input line 28 from control signal line 16. Immediately, counter 24 begins counting the number of peaks in the AC input signal and sends an output signal over line 30 to open the normally closed switch 26. It will be obvious to the artisan that the count can be based on either the peaks or the zero crossings of the AC input signal as both may be easily accomplished with conventional circuitry. In either case, counter 24 totalizes the number of counts. During this first cycle, switch 26 is held open which, as seen by equipment control switch 18, is exactly the same as the state in which there is no signal in control signal line 16, which corresponds to the state in which conditioning device is satisfied, e.g., thermostat 14 is satisfied and not calling for cooling. For simplicity of description, this cycle is hereinafter referred to as the "off" cycle of the demand control apparatus.

In the interest of completeness, the first or "off" cycle of the demand controller with reference to an electric water heater load will be as described for comparison. A typical sequence of events follows:

(1) The water temperature drops below that called for by the water thermostat (conditioning device 14) within the equipment.

(2) The water thermostat (conditioning device 14) sends a control signal over control signal line 16 which would normally close equipment switch 18 and allow current to flow from main power line 10 to the heating coils of the equipment (load 20).

(3) The control signal is interrupted by the demand control apparatus which, immediately upon sensing the control signal in control signal line 16, through input line 28, commands counter 24 to open switch 26 and begin counting the oscillations in the "off" cycle.

As before in the air conditioner example, the state of equipment switch 18 remains exactly as it would have been in the absence of the control signal in control signal line 16, which corresponds to the state in which conditioning device is satisfied, e.g., thermostat 14 is satisfied and not calling for heating.

In both the above cooling and heating examples, it will be noted that the effect of the demand control apparatus thus far described is merely that of a delay switch. When cooling is called for, the onset of that cooling is delayed by the demand control apparatus; and when heating is called for, the onset of that heating is delayed by the demand control apparatus. However, the demand control apparatus does much more than act as a simple delay switch as will become evident from the remainder of this discussion.

Upon reaching a particular preset number of counts in the "off" cycle, counter 24 sends a signal over its output line 30 to close switch 26, thereby completing the normal circuit of control power line 16. In actual practice, the "signal" over output line 30 is really the absence of a signal which allows switch 26 to return to its normally closed position. In accordance with conventional terminology used in digital control technology, the absence of a voltage or a current in a line is often, as here, referred to as a signal. In this state, referred to as the "on" state, the demand control apparatus effectively steps out of the way and allows the conditioning device 14 to control the load as it normally would through equipment switch 18.

The "on" state triggers the separate counting and totalizing of the peaks in the AC input line 28. The "on" cycle of the demand control apparatus is maintained until the count total reaches a second preset number. The count during the on cycle can be interrupted in one of two ways. The first way is for the count to reach the second preset number allowed for in the "on" period of the equipment. In this case, the counter switches to the "off" cycle, opens switch 26, and begins a new count applied to the "off" cycle total. The second way is for the conditioning device or thermostat 14 to become satisfied at some time during the "on" cycle. In this case, the "satisfaction" signal from the thermostat causes the demand control device to stop counting anything and reset all totals to zero. Switch 26 is returned to its normally closed position in this state. In actual practice, the normal "satisfaction" signal from the thermostat corresponds to the absence of any signal in control signal line 16. Since there is normally no power present in the control signal line when the thermostat is satisfied, there is no power provided or consumed by the demand control apparatus during these periods. The fact that no power is consumed by the demand control apparatus during the periods when the equipment conditioning device is not sending a signal thus satisfies an important objective of the invention of not consuming unnecessary power in the process of controlling the use of power.

The digital recycle counter is designed so as to restart itself in a new "off" period counting cycle whenever interrupted power is again present in control signal line 16 to 28, i.e., whenever the thermostat again calls for cooling or heating. It is also important to note that control signal line 16 may be absent power because of normal switching at the thermostatic control device 14 or because of an overall power outage at the facility where the equipment is located. By restarting itself with a predetermined "off" period the demand control apparatus of the present invention also serves as an important synchronized network startup apparatus to assist utilities in getting back on line after emergency power outages. If a significant number of the power consuming devices on a network are controlled by the demand control apparatus of this invention, it is obvious that upon restoration of power to that network there will not be the characteristic startup surge of, say, thousands of motor loads. It is a well known fact that it takes more power to start and accelerate an electric motor than to maintain its rotation at a constant speed. If each individual motor load, as envisaged by this invention, is controlled by a demand controller, they will all be switched off line immediately when power returns to the lines. In addition, they will all be started at the individual count that has been preset for their individual "off" cycles. These preset "off" counts will not be the same for all motors on all the equipment. For example, one motor may be starting after, say, 3600 counts whereas another motor may come on line after, say, 5400 counts. Thus the startup transients from the first motor will have long disappeared before the startup transients of the second motor are introduced to the overall network. By appropriately staggering the "off" cycles of large energy consumption units on a network, the utility can be assured that startup transients will not be intolerable after a power outage. Likewise, individual users can prevent simultaneous startup transients from multiple units, as for example, in a large refrigeration plant having many units at a single locality.

With the apparatus of the present invention in the control signal line of an equipment, the "off" and "on" cycles, determined solely by counter 24, are imposed on the equipment during all periods when the normal equipment control (e.g. a thermostat) is calling for the equipment to be operated. The demand control device, in a sense, overrides the normal thermostatic controls of the equipment. However, the normal thermostatic controls must operate to activate the demand control device.

As an example, a space cooling unit might be under the overall control of a thermostat. When the thermostat first calls for cooling, the demand control device prevents operation of the cooling unit for an "off" period of typically about three minutes. Then, if the thermostat is still calling for cooling, the cooling unit is allowed to operate for an "on" cycle period which may be slightly longer, or about 4 minutes. If the thermostat is still calling for cooling after the 4 minutes of "on" operation of the cooling unit, the demand controller imposes another 3 minute "off" period on the cooling unit. Since the thermostat was not satisfied by the first 4 minute "on" period, it will probably still not be satisfied after the imposed 3 minute "off" period and another 4 minute "on" period will be allowed by the demand controller. Let us assume for the purposes of this example, that the thermostat is finally satisfied halfway through, or about 2 minutes into, the second "on" period. At this point, about 12 minutes (3 minutes off plus 4 minutes on plus 3 minutes off plus 2 minutes on) after the thermostat first called for cooling, the thermostat has been satisfied and the interior space is adequately cooled. During this 12 minute period the cooling unit has only actually operated for 6 minutes with a first 4 minute period followed by a rest of 3 minutes and a final 2 minute period. It has been found that the cooling accomplished by operating an air conditioning unit for 6 minutes in the pulsed nature just described, can approximate the cooling accomplished by operating the same unit for 6 continuous minutes as would be attempted by the equipment alone in the absence of the demand control apparatus.

In fact, it can be shown, both theoretically and by test data, that the cooling unit of the instant example cannot satisfy the thermostat in 6 continuous minutes of running. In an actual typical situation it would take about 10 minutes of continuous running of the cooling unit to achieve the same temperature in the same space as can be done in 6 minutes in the cyclic manner forced by the demand controller. Thus it is common for refrigeration and air conditioning equipment fitted with this invention to achieve increased efficiency. One reason for the increased efficiency is that a refrigeration compressor delivers more liquid freon to an evaporator coil (where the cooling occurs) when the process just begins, because there is no back pressure at the evaporator and because the evaporator is at a higher temperature after an "off" period. Another reason for the increased efficiency is the diminished formation of efficiency robbing ice at the evaporator coil, because of the warmup periods afforded by the imposed "off" periods. Ice formation is particularly deleterious to performance because it not only robs cooling capacity from the circulated air, but also it chokes the airflow and interferes with the circulation of that air over the evaporator coils.

It is important to note the apparatus of the present invention imposes its control on the load only through existing equipment load controls. Thus any special operation parameters of the equipment, such as freon pumpdown prior to compressor shutdown, are not interfered with by the addition of this load controller. Each counter is custom tailored to the specific needs, function, environment, and shortest effective window of operation for each load requirement of the equipment. "Optimum run operation" of one complete off/on cycle is determined for the load, based upon measurements and observations at the actual installation site. The counter is preset for that respective cycle of operation by setting the "off" and "on" cycles by means of DIP switches 32 on the face of counter 24.

Alternately, optical adjuster device 8, similar to infrared remotes on television sets, can be used to send signals to digital recycle counter 24.

AS previously described, the load is always off during the first preset number of totalized pulses, and a second preset number of totalized pulses governs the on time in which the load operates according to its own control parameters.

For another example, in the normal operation of refrigeration equipment, a compressor under its own thermostatic control may run for a long continuous period attempting to satisfy the equipment thermostat. Thus, frost may build up on the chilling coils which significantly reduces their chilling capacity. As previously discussed, air is cooled much more efficiently by passing it directly over very cold metal surfaces than it is by passing it over ice or frost layers on those metal surfaces. Electrical resistance heat is often employed in a defrost period. If during the defrost period, the temperature of the air being chilled rises above the reset or cutout thermostat setting, the defrost period is prematurely cut short and the compressor starts. The compressor once again runs continuously for an even longer period to satisfy the equipment thermostat control, thereby forming ice, so a longer defrost period is needed. This time the extended defrost cycle causes the air temperature to rise quickly above the reset or cutout thermostat setting, so the defrost period is prematurely cut again and the compressor overruns much too long. The cycle continues to build and worsen. This seemingly extreme example of inefficient operation is actually quite common. The relatively cheap cost of electrical energy has led many to tolerate such excesses. Refrigeration equipment operated in this manner is inefficient, wastes energy, and wears out rapidly.

Under control of the demand control apparatus of the present invention, a compressor has an optimum run or "on" time imposed upon it. This "on" time is determined at the time of installation of the apparatus and is dependent on local conditions. For example, if a small dwelling is equipped with a particularly massive cooling unit, a relatively short "on" time may be desirable. On the other hand, a longer "on" time might be needed if the particular cooling unit has a smaller capacity. In nearly all cases, however, the "on" time selected would be a time less than that necessary to satisfy the thermostat under continuous running. By preventing continuous run periods, efficiency is increased and frost buildup is inhibited.

The imposed "off" time of the optimum run operation cycle allows hot liquid freon from the condenser to transfer heat by conduction and convection to the coldest point at entrance to evaporator coils and further inhibit the formation of frost. The compressor would then be cycled on again, providing more chilling through frostless coils, thus gradually satisfying the thermostat with an optimum run operation cycle. This imposed control further reduces the defrost periods necessary because the formation of frost has been initially inhibited. The demand control apparatus has precluded overrun of the compressor of the refrigeration equipment while also satisfying the requirements of the equipment controls, and therefore the efficiency of the equipment is significantly enhanced. The refrigeration equipment could be cycled for longer on periods during off-peak hours, such as late evening/early morning hours, to build a reserve which could be used during peak periods, thereby allowing the counter to actuate the load for shorter "on" intervals during peak periods, further enhancing efficiency and controlling demand. This apparatus obtains unequaled results in the control and limit of diverse and individual load demand, since the load does not demand energy throughout the entire period of time which it normally would were it ungoverned by the demand control apparatus. Additionally, imposed control of the demand control apparatus prolongs component life and reduces the necessary maintenance and repair.

The digital recycle counter 24 employs DIP switches 32 for adjusting the various preset pulse count parameters once the off/on periods of the optimum run operation cycle of the load are determined. Switches 32 may be any suitable configuration for such task; for example, dual-in-package (DIP) switches. Two banks of switches 32 are used with one bank for setting the "off" count and the other for setting the "on" count. For the convenience of the installer, switches 32 may have indicator indicia approximated by real time, but this is not really necessary. The indicator indicia may also represent the totalized pulses. Alternately, optical devices can be used to perform the adjustment function from a remote location.

The counter does not employ any real time or any timing device in determining the onset or termination of the optimum run operation cycle off/on intervals. Rather, it counts the number of pulses in the frequency of the signal in control signal line 16, so the power line pulsations are only related to time insofar as the frequency is a predetermined constant. Contrary to popular belief, the frequency of a typical power line is not a constant 60 Hertz and therefore 60 counts does not necessarily correspond to an exact time period of 1 second. In fact, the only time counter 24 is active is when a control signal is sent through control signal line 16 from the equipment controls 14 to actuate existing load relay switch 18. In other words, if no equipment control signal is sent to control signal line 16 to actuate switch 18 and energize load 20, counter 24 is dormant and draws no energy. The dormant counter makes no counts, keeps no "time", and consumes no energy during these periods. Thus, counter 24 not only controls the load demand and operation, but also conforms to that objective by not requiring a continuous power supply to function.

Based solely upon the totalized number of pulses, counter 24 determines, from the preset parameters of the optimum run cycle of operation, when to actuate switch 26. Switch 26 opens or closes accordingly, completing or breaking the circuit of control signal line 16 to switch 18. If switch 26 is closed, which it normally is until acted upon by counter 24, the circuit is complete and control power line 16 actuates switch 18 in accordance with the normal desires of the equipment itself. If switch 26 opens and breaks the circuit of control signal line 16, equipment relay switch 18 cannot be closed and no operative power can be supplied to the load through operative power line 10. It is thus seen that counter 24 imposes a precisely controlled optimum run operation on load 20.

Since both utility meter 12 and counter 24 are AC line synchronized, the imposed control from counter 24 keeps the off/on optimum run cycle of the equipment "in sync" with the meter. If there is an interruption of power, such as an outage, counter 24 and meter 12 naturally both lose power. Upon resumption of power, the preset totalized pulse intervals in counter 24 do not resume where they had been interrupted, but rather, a new off/on optimum run cycle of operation for the controlled load is begun. While meter 12 may start a new demand metering interval, this is not a necessary consideration of counter 24, as is required by many other methods and systems. The very fact that the load is cycled off during a portion of the metered interval, where it would normally be on, is enough to reduce demand and thereby reduce demand charges from the utility company. Since the load is functioning in a maximum efficient window of operation, it will be controlled by counter 24 to cycle "on" a great deal less than it would if it were operating under its own equipment controls, thereby significantly limiting demand. Further, the fact that the load is controlled in its operation allows for additional loads to be added to a supposedly maximum load capacity, with no malfunction of equipment and no overload.

Also, upon resumption of power after an interruption or outage, load 20 will not be energized instantly since it is controlled by counter 24, which starts a new off/on optimum run cycle, the first interval being the off interval. There is no need to have a time delay, no need for adjustment to the controls of the load, and no need to turn equipment off manually. It is also insured that upon resumption of power, there are no simultaneous transient high start up currents imposed upon the circuits connecting the individual loads at a given location. Note that if the "off" counts of the various controlled equipment are set slightly differently, they will be automatically staggered when they come back on line. Equipment at various locations on the entire electrical network, as seen from the electrical generation facility, can be similarly staggered for trouble-free startup after a power outage. There is no load demand surge created, since no controlled load is energized at the moment of power resumption, nor are any two loads energized at the same time after the cessation of the first off intervals of the respective counters. Each load is individually controlled by its own process apparatus, which is customized to allow an individual "off" count and an individual "on" count for its respective load, so different loads would automatically be energized at different counts.

The actual "off" counts chosen for various equipment at a given location, or for groups of subscribers on a network, are the subject matter of study and development which must be done in cooperation with the individual utility companies. The actual schemes developed from these studies may become the subject matter of future patents. The point here is that the optimizer of this invention provides an ideal mechanism for implementing such schemes.

Particularly important is the fact that after an outage, if switches 32 have been adjusted to, for example, an indication of "one minute" (equal to 3600 pulses) for a first totalized pulse "off" interval for load 20, and the utility company can only generate a frequency of 58 Hertz or 3480 pulses during the first real time minute after power resumption, counter 24 will not cycle into a first totalized pulse "on" interval for load 20 until 120 counts past that one minute of real time, or approximately 62.07 seconds, since it does not actually operate on the basis of the time increment indicia inscribed beside switches 32. The counter recognizes only a precise point (such as a positive peak, a negative peak, or a zero crossing) of an oscillation in the control signal line 16 and totalizes a sufficient number of those precise points of the pulses to match the preset interval, even if the real time exceeds or falls short of the indicated interval.

As a further example, the first interval of "off" time for a load may be indicated as two minutes according to the indicia on the face of the counter next to the dip switches. In reality the setting is not two minutes, but rather 7200 totalized oscillation counts. If the utility company exceeds or falls short of 7200 oscillations in two minutes, the indicated "two minutes" of time set on DIP switches 32 does not correspond with two minutes of real time and the counter will not operate to change any cycle in precisely two minutes of real time. If only 6600 oscillations are generated during the first two minutes of real time (55 Hertz), counter 24 will count 600 pulses further before operating control signal line switch 26. If 7200 oscillations are generated during only one and three-quarter minutes of real time, DIP switches 32 may be set with an indication of "two minutes", but counter 24 actuates control signal line 26 after only one and three-quarter minutes real time, according to the totalized pulses. The totalized oscillation counts are the sole criteria by which counter 24 will actuate switch 26.

Therefore, load 20 is always synchronized with the power supplied to it, and has a precise control of its load demand imposed upon it by rigid enforcement of its optimum run cycle of operation.

Counter 24 also makes provision for adjustment to an "alternate" off/on optimum run cycle of operation based upon a contingency for such adjustment from external information. The general input location for external conditions is indicated schematically in FIG. 1 by external condition device 36. It should be understood the external condition device could be built into the counter 24. Generally, external sensors send information to device 36, and that external information is processed by device 36 so as to signal counter 24 when to switch to an alternate run cycle.

The "alternate" run cycles consist of additional preset "off" or "on" intervals allowing extension of the run cycle periods during exceptional circumstances. These additional "off" periods and "on" periods are completely independent of the periods discussed up until now, and they are used for fine tuning the periods to achieve an alternate optimum run cycle of operation to further enhance load efficiency. In practice, the alternate run periods are simply additional counts added to the normal counts of the "on" cycle and/or additional counts added to normal counts of the "off" cycle. The counts for these additional "off" and "on" periods are each preset and controlled by an independent set of DIP switches on the counter face at 32 and are referred to hereafter as the "extend" periods. Alternately, optical means can be used to perform the same function.

If the equipment being controlled is a heat pump and resistance heat, each would have its own counter set to an optimum run cycle of operation which would also complement the operation of the other; the heat pump would operate when the resistance heating unit was off, and vice versa.

In the case of resistance heating, the counters would receive input from an external sensor, such as a temperature sensor, located outside the structure in which the equipment is housed. When the outside temperature goes above a preset limit of external condition device 36, it would signal the counters so that the resistance heat would be cycled "off" for the normal off interval plus the preset "off extend" interval. In other words, if heating is being delivered and it becomes warm outside, less heat will be delivered.

Further in the case of resistance heating, if the external sensor indicated a temperature below a critical preset limit in device 36, it would signal the counters to increase the overall resistance heat "on" interval by adding the "on extend" interval to the normal "on" interval. In other words, if heating is being delivered and it becomes very cold outside, more heat will be delivered.

In the case of heat pump cooling, the counters would also receive input from an external sensor, such as a temperature sensor, located outside the structure in which the equipment is housed. When the outside temperature goes above a different preset critical limit (set in external condition device 36), it would signal the counters so that the heat pump cooling compressor would be cycled "on" for the normal on interval plus the preset "on extend" interval. In other words, if cooling is being delivered and it becomes warm outside, more cooling will be delivered.

Further in the case of heat pump cooling, if the external sensor indicated a temperature below a critical preset limit in device 36, it would signal the counters to decrease the overall cooling by extending the "off" period of the heat pump compressor by adding the "off extend" interval to the normal "off" interval. In other words, if cooling is being delivered and it becomes cold outside, less cooling will be delivered.

Thus, an "alternate" optimum run cycle of operation is imposed by external sensors on the counters to gain enhanced efficient use of temperature conditioning equipment such as a heat pump and resistance heat.

No other process, system or device known imposes such a precise and efficient load demand and operation cycle for the load it controls within easy operating parameters of the equipment.

Since the counter operates by totalizing the count of pulses of the frequency of the power, the operation of the unit is precise in its synchronization with the power supplied to it. Since precise control is imposed upon the load to limit it to an optimum run off/on operation cycle during any demand metering interval, the demand of the load or loads of the equipment is greatly reduced. More importantly, all such controlled equipment is in precise synchronization with the power supplied, so that a reduced overall electrical demand on the generating equipment is present at any given time. If the utility company has a problem with a particular plant and must take it off-line, any interruption in the oscillations in the power line during the change-over will automatically turn off controlled loads in the respective power lines in which the interruption occurs. In fact, the utility company itself can control load demand simply by momentarily interrupting supply power flow lines to restart the preset "off" intervals and automatically turn off the respective controlled loads along given lines or over the entire service area.

It is recognized, however, that turning off the power to an entire grid of users, even momentarily, can lead to many unwanted side effects. For example, the electrical power supplied to a computer must be constantly supplied during operation. A momentary lapse of power to a computer can cause complete loss of all random access memory and consequent loss of control and valuable data. As another example, momentary loss of power to most digital clocks will require them to be manually reset. Therefore it is imperative that power lapses be minimized, and it is recognized that the above mentioned momentary blackout counter resetting mechanism is not practical.

The remainder of this specification will describe an aspect of the demand control apparatus of this invention that is, indeed, very practical for use in demand shedding, and well within the realm of current technology. The invention, thus far described, has essentially been described in my earlier applications referred to in the first section of this specification. The previous description has followed the pattern of those earlier applications with some minor amplification and changes made for the sake of clarity. The following description, on the other hand, presents new concepts, heretofore unknown.

Note that external condition device 36 of FIG. 1 is shown with an input tap from the control signal line 16. How can the control signal line be a source of an external input? The answer is that the line current oscillates with an alternating current whose frequency is controllable from an external source. It is well known to even the general public that the standard frequency of the power lines in the United States is 60 Hertz (cycles per second). The standard frequency in many European countries is 50 Hertz. In the old days the frequency of the electrical power depended solely upon the rotation speed of the electromagnetic dynamo used to generate the power. If the dynamo slowed down the frequency of the power would be low, and if it speeded up the frequency would be high. This is no longer true. Modern electrical power generation plants have the capability to precisely control the frequency of the power they generate and provide over their lines. As a matter of fact, the line frequency can be easily controlled to a precision of 0.01 Hertz or one one-hundredth of a cycle per second. This precise frequency control is in fact used by the utilities for various purposes today, but not for the purpose envisioned here. It is known, for example, that some utilities run on a frequency of 59.99 Hertz during the day and a frequency of 60.01 Hertz during the evening to make up for the lost time on subscribers electrical clocks. The purpose here is not to fully describe how or why the utilities control the line frequency, but rather merely to indicate that such line frequency control is conventional and is being routinely accomplished at the present time.

For purposes of the instant invention, external condition device 36 may be equipped with a line frequency sensing circuit which, upon sensing a predetermined frequency in control signal line, will signal the counter to switch to the "extend" mode described above. The details of such circuitry are conventional and not further described herein. Such a line frequency sensitive counting device is commercially available from S.S.A.C. of Baldwinsville, N.Y., and may be ordered as part number FDD24A-3324.

For purposes of simplicity, the frequency sensitive digital recycle counter operation will be exemplified here only in one of its simplest applications. Let us suppose that it is a very hot day and the air conditioning demand for a given area is at a very high level with the generating plant being stretched to the limits of its capacity.

Present day options for the utilities are very limited. The voltage may be reduced by perhaps 10% going into what is known as a "brown out" phase. Power may be transferred from neighboring utility companies but they may not have extra available. As a last resort, power supplied to certain non-essential users may be interrupted. Finally, after all else fails, the various utilities involved are forced to go into a massive "rolling blackout" in which large areas of the country are completely without power at the time they need it the most. The economic and social consequences can be serious and even disastrous. Such rolling blackouts have already occurred along the east coast of the United States.

Let us explore the same critical situation assuming that the air conditioning and refrigeration loads have been equipped with the instant invention. The preset critical line frequency of the frequency sensing units in the optimizer counters will be assumed to have been set at 59.9 Hertz. When the line frequency drops to 59.9 Hertz, the frequency sensors will send an extend signal to the counters of all controlled units so as to increase the "off" cycle by adding to it the preset "off extend" cycle previously described. With every air conditioning unit being imposed an additional off period, the overall load seen by the utility will be dramatically reduced and fewer users will suffer brown outs or black outs. In addition, the slightly reduced cooling capacity at individual locations will be a slight inconvenience to some and probably not even noticed by most.

Thus, when the utility company gets into demand trouble all that need be done is to reduce the line frequency by a mere 0.1 Hertz! This is the ultimate in demand control from the standpoint of the utility. It requires no capital investment in equipment because the line frequency controllers are already in place. From the standpoint of the consumer, installation of the devices on his equipment is relatively inexpensive and the savings in energy bills will pay for the optimizing equipment in less than a year in almost all cases.

It is contemplated that a much more sophisticated line frequency signal scheme could be developed to send all kinds of communication signals to receiving equipment. For example, different critical line frequency values could be used to shed load from different classes of subscribers. Load from industrial users could be cut back at, say, 59.9 Hertz while load from residential users could be cut back at 59.8

Hertz. As another example, a signal of one frequency for a certain period of time followed by another frequency for another period of time could signal some equipment to increase their "off" cycle and other equipment to decrease their "on" cycle. Both types of cycle changes would reduce the overall demand on the utility. The permutations and combinations of communications possible by controlling power line frequency is endless. The various possibilities will be the subject matter of future patent applications. This is the purest demand control and management possible at this time.

The present invention is far superior to any other method or system known. The apparatus is also very inexpensive and easy to install. It requires no alteration of the existing equipment or its working components. It does not preclude the controls of the device itself, but rather complements them, imposing optimum efficient operation well within the operating parameters of the equipment to satisfy the equipment controls. It needs no other component to control and manage year-round demand and operation of a load, and in fact draws no energy when not activated by the control signal line from the equipment controls.

Therefore, the embodiments described in the present application are not to be taken as a limiting disclosure, since endless variations and applications of the present apparatus are envisioned.

I claim:

1. An apparatus for automatically controlling and managing load demand and operation of energy-consuming equipment powered by alternating electrical power current on electric power supply lines from a utility company, the equipment having individual loads, the power to each of which is controlled by oscillating control signals on control signal lines, wherein the oscillating control signals are derived from and synchronized with the alternating electrical power current and the control signal lines are separate from the electric power supply lines, comprising:

demand control means, interposed in the control signal lines of the individual loads of the equipment, each said demand control means comprising;

switch means in series with the control signal line to open and close the control signal line;

digital recycle counter means, connected only to the control signal line and to said switch means, and operable to open and close the control signal line by cyclically opening and closing said switch means only when the equipment provides the oscillating control signals on the control signal line, wherein said digital recycle counter means comprises;

counting means for generating a count of the oscillations of the oscillating control signal in the control signal line,       setting means for manually presetting a desired number of counts for an "off" cycle and a desired number of counts for an "on" cycle,       means for closing said switch means and restarting said counting means when said count of the oscillations equals said desired number of counts for an "off" cycle,       means for opening said switch means and restarting said counting means when said count of the oscillations equals said desired number of counts for an "on" cycle, and       means for alternating continuously between said "off" cycle and said "on" cycle as long as the oscillating control signal is present in the control signal line; and       means for closing said switch means and stopping the counting means upon cessation of the oscillating control signal in the control signal line; and       means for opening said switch means and restarting said counting means from a count of zero in said "off" cycle immediately upon restoration of the control signal in the control signal line; thereby imposing said "off" cycle, as set by said setting means, followed by said "on" cycle, as set by said setting means, upon the control signal during all times when the control signal is present and delaying initiation of any control signal by at least the period of said "off" cycle, wherein     the energy consumed by the equipment is reduced and the efficiency of the equipment is increased and whereby absolutely no electrical power is consumed by said demand control means when said energy consuming equipment is not operating.

2. The apparatus of claim 1, wherein said setting means for manually presetting a desired number of counts is adjusted to impose optimum efficiency on its corresponding equipment, and     reduced electrical energy will be required by the individual loads of the equipment thereby reducing the overall demands on the electric power lines of the utility, resulting in lower utility service charges, higher equipment efficiency, and longer equipment life.

3. The apparatus of claim 1 wherein said setting means for manually presetting a desired number of counts are banks of DIP switches.

4. The apparatus of claim 1 wherein said setting means for manually presetting a desired number of counts are optical adjuster means including a hand held transmitter and a receiver in said digital recycle counter means.

5. The apparatus of claim 1, wherein the control signal line is a thermostat line of a refrigeration unit.

6. The apparatus of claim 1, wherein the control signal line is a thermostat line of a resistance heating unit.

7. An apparatus for automatically controlling and managing load demand and operation of energy-consuming equipment powered by alternating electrical power current on electric power supply lines from a utility company, the equipment having individual loads, the power to each of which is controlled by oscillating control signals on control signal lines, wherein the oscillating control signals are derived from and synchronized with the alternating electrical power current and the control signal lines are separate from the electric power supply lines, comprising:

demand control means, interposed wholly within the control signal lines of the individual loads of the equipment, each said demand control means comprising;

switch means in series with the control signal line to open and close the control signal line;

digital recycle counter means operable to open and close the control signal line by providing counted cyclic opening and closing signals to said switch means only when the equipment provides the oscillating control signals on the control signal line; and     external conditioning means, responsive to external signals, for regulating said digital recycle counter means by altering the counts of said counted cyclic opening and closing signals to said switch means in response to said external signals; wherein said digital recycle counter comprises;

counting means for generating a count of the oscillations of the oscillating control signal in the control signal line, setting means for manually presetting a number of counts for a normal "off" cycle, a number of counts for a normal "on" cycle, a number of counts for an "off extend" cycle, and a number of counts for an "on extend" cycle;

extend means, responsive to said external conditioning means, said extend means operable to set a desired number of counts in an "off" cycle equal to said number of counts in said normal "off" cycle when said external condition means indicates a normal external condition, set a desired number of counts in an "off" cycle equal to said number of counts in said normal "off" cycle plus said number of counts in said "off extend" cycle when said external condition means indicates an abnormal external condition, set a desired number of counts in an "on" cycle equal to said number of counts in said normal "on" cycle when said external condition means indicates a normal external condition, and set a desired number of counts in an "on" cycle equal to said number of counts in said normal "on" Cycle plus said number of counts in said "on extend" cycle when said external condition means indicates an abnormal external condition;

means for closing said switch means and restarting said counting means when said count of the oscillations equals said desired number of counts for an "off" cycle, means for opening said switch means and restarting said counting means when said count of the oscillations equals said desired number of counts for an "on" cycle, and means for alternating continuously between said "off" cycle and said "on" cycle as long as the oscillating control signal is present in the control signal line; and means for closing said switch means and stopping the counting means upon cessation of the oscillating control signal in the control signal line; and means for opening said switch means and restarting said counting means from a count of zero in said "off" cycle immediately upon restoration of the control signal in the control signal line; thereby imposing said "off" cycle, as set by said extend means, followed by said "on" cycle, as set by said extend means, upon the control signal during all times when the control signal is present and delaying initiation of any control signal by at least the period of said "off" cycle, wherein the energy consumed by the equipment is reduced and the operation efficiency of the equipment optimized in accordance with said external signals and whereby absolutely no electrical power is consumed by said demand control means when said energy consuming equipment is not operating.

8. The apparatus of claim 7 wherein said setting means for manually presetting a desired number of counts are banks of DIP switches.

9. The apparatus of claim 7 wherein said setting means for manually presetting a desired number of counts are optical adjuster means including a hand held transmitter and a receiver in said digital recycle counter means.

10. An apparatus for automatically controlling and managing load demand and operation of energy-consuming equipment powered by alternating electrical power current on electric power supply lines from a utility company, the equipment having individual loads, the power to each of which is controlled by oscillating control signals on control signal lines, wherein the oscillating control signals are derived from and synchronized with the alternating electrical power current and the control signal lines are separate from the electric power supply lines, comprising:

demand control means, interposed wholly within the control signal lines of the individual loads of the equipment, each said demand control means comprising;

switch means in series with the control signal line to open and close the control signal line;

digital recycle counter means operable to open and close the control signal line by providing counted cyclic opening and closing signals to said switch means only when the equipment provides the oscillating control signals on the control signal line; and external conditioning means, responsive to an external signal, said external signal being derived from an outside temperature sensor in the vicinity of the equipment and said external condition means only indicates an abnormal condition when the sensed outside temperature is abnormally hot or abnormally cold, said signal for regulating said digital recycle counter means by altering the counts of said counted cyclic opening and closing signals to said switch means in response to said external signals; wherein the energy consumed by the equipment is reduced and the operation efficiency of the equipment optimized in accordance with said external signals.

11. An apparatus for automatically controlling and managing load demand and operation of energy-consuming equipment powered by alternating electrical power current on electric power supply lines from a utility company, the equipment having individual loads, the power to each of which is controlled by oscillating control signals on control signal lines, wherein the oscillating control signals are derived from and synchronized with the alternating electrical power current and the control signal lines are separate from the electric power supply lines, comprising:

demand control means, interposed wholly within the control signal lines of the individual loads of the equipment, each said demand control means comprising;

switch means in series with the control signal line to open and close the control signal line;

digital recycle counter means operable to open and close the control signal line by providing counted cyclic opening and closing signals to said switch means only when the equipment provides the oscillating control signals on the control signal line; and external conditioning means, responsive to an external signal, said external signal being derived from the power supply line frequency, controllable by the utility, and said external condition sensor only indicates an abnormal condition when said power line frequency differs by a predetermined amount from a standard operating frequency, said signal for regulating said digital recycle counter means by altering the counts of said counted cyclic opening and closing signals to said switch means in response to said external signals; wherein the energy consumed by the equipment is reduced and the operation efficiency of the equipment optimized in accordance with said external signals.

* * * * *